(12) United States Patent
Antic

(10) Patent No.: US 11,823,060 B2
(45) Date of Patent: Nov. 21, 2023

(54) METHOD AND SYSTEM FOR PERFORMING DETERMINISTIC DATA PROCESSING THROUGH ARTIFICIAL INTELLIGENCE

(71) Applicant: HCL America, Inc., Boca Raton, FL (US)

(72) Inventor: Stevan Antic, Boca Raton, FL (US)

(73) Assignee: HCL America, Inc., Boca Raton, FL (US)

( * ) Notice: Subject to any disclaimer, the term of this patent is extended or adjusted under 35 U.S.C. 154(b) by 635 days.

(21) Appl. No.: 16/861,524

(22) Filed: Apr. 29, 2020

(65) Prior Publication Data

US 2021/0342700 A1    Nov. 4, 2021

(51) Int. Cl.
*G06N 3/088* (2023.01)
*H04L 9/00* (2022.01)
*G06N 3/045* (2023.01)

(52) U.S. Cl.
CPC ............. *G06N 3/088* (2013.01); *G06N 3/045* (2023.01); *H04L 9/008* (2013.01)

(58) Field of Classification Search
CPC ............... H04L 67/1097; H04L 9/0861; H04L 2209/34; H04L 67/10; H04L 9/0894; H04L 67/12; H04L 47/70; H04L 69/04; H04L 9/0897; H04L 67/025; H04L 63/1425; G06F 11/1076; G06F 11/1092; G06F 11/2094; G06F 3/067; G06F 11/1004; G06F 2211/1028; G06F 16/9014; G06F 21/567; G06F 16/212; G06F 21/565; G06N 20/00; G06N 3/0454; G06N 3/084; G06N 3/04; G06N 5/003; G06N 3/063; G06N 3/088

USPC .......... 706/25; 726/2, 21, 36; 713/150, 163, 713/181; 380/255, 264, 276
See application file for complete search history.

(56) References Cited

U.S. PATENT DOCUMENTS

| | | | |
|---|---|---|---|
| 8,908,978 B2* | 12/2014 | Oka | H03M 7/3062 |
| | | | 382/232 |
| 9,342,781 B2* | 5/2016 | Cornebise | G06N 3/045 |
| 10,289,816 B1* | 5/2019 | Malassenet | G06F 21/14 |
| 10,885,627 B2* | 1/2021 | Min | G06N 7/01 |
| 11,295,197 B2* | 4/2022 | Murali | G06Q 30/0202 |

(Continued)

FOREIGN PATENT DOCUMENTS

| CN | 109086883 A | 12/2018 |
|---|---|---|
| JP | 2016538645 A | 12/2016 |

OTHER PUBLICATIONS

Phillip Isola, "Image-to-Image Translation with Conditional Adversarial Networks".

(Continued)

*Primary Examiner* — Sharif E Ullah

(57) ABSTRACT

A method for performing deterministic data processing through Artificial Intelligence (AI) is disclosed. The method may include generating, via a deep learning network, a set of input feature vectors based on input data for a deterministic data processing model. The method may further include providing the set of input feature vectors to a trained AI model. The trained AI model may generate a set of output feature vectors that may correspond to an output data of the deterministic data processing model. The method may further include determining a variation between the set of output feature vectors and the output data, and iteratively performing incremental learning of the AI model based on the determined variation.

15 Claims, 8 Drawing Sheets

(56) References Cited

U.S. PATENT DOCUMENTS

| | | | |
|---|---|---|---|
| 2017/0293838 A1* | 10/2017 | Min | G06N 3/045 |
| 2019/0147320 A1* | 5/2019 | Mattyus | G06V 20/182 |
| | | | 382/155 |
| 2019/0251418 A1* | 8/2019 | Nakanishi | G06N 3/045 |
| 2019/0258927 A1* | 8/2019 | Chen | G06N 3/04 |

OTHER PUBLICATIONS

Jesus Rodriguez, "Adversarial Neural Cryptography can Solve the Biggest Friction Point in Modern AI"; https://towardsdatascience.com/adversarial-neural-cryptography-can-solve-the-biggest-friction-point-in-modern-ai-cc13b337f969.

Nathan Dowlin, "Cryptonets: Applying Neural Networks to Encrypted Data with High Throughput and Accuracy".

Ehsan Hesamifard, "CryptoDL: Deep Neural Networks over Encrypted Data".

Edward Chou, "Faster Cryptonets: Leveraging Sparsity for Real-World Encrypted Inference".

Fabian Boemer, "HE-Transformer for nGraph: Enabling Deep Learning on Encrypted Data"; https://www.intel.com/content/www/us/en/artificial-intelligence/posts/he-transformer-for-ngraph-enabling-deep-learning-on-encrypted-data.html#gs.xg68l1.

Kyoohyung Han, "Efficient Logistic Regression on Large Encrypted Data".

* cited by examiner

US 11,823,060 B2

METHOD AND SYSTEM FOR PERFORMING DETERMINISTIC DATA PROCESSING THROUGH ARTIFICIAL INTELLIGENCE

TECHNICAL FIELD

This disclosure relates generally to data processing, and more particularly to a method and system for performing deterministic data processing through Artificial Intelligence (AI).

BACKGROUND

Various data processing systems are known to perform one or more types of data processing. For example, the one or more types of data processing may include normalizing, cleaning, and validating of data. However, performing deterministic processing of data may be difficult using these systems. Further, the processing performance (i.e. speed, memory usage, security, CPU usage) of these systems is critical when they are used in real-time processing environments. The real-time processing environments, for example, may be associated with online transactions, especially during high load scenarios, for example, black Friday, medical records validation, and online and offline data preparation for Machine Learning (ML) models. As such, deterministically processing the data in such real-time processing environments becomes a challenge.

Therefore, an effective and efficient technique for performing deterministic data processing is desired, preferably by the use of an artificial intelligence (AI) based data processing system.

SUMMARY

In one embodiment, a method for performing deterministic data processing through Artificial Intelligence (AI) is disclosed. The method may include generating, via a deep learning network, a set of input feature vectors based on input data for a deterministic data processing model. The method may further include providing the set of input feature vectors to a trained AI model. The trained AI model may generate a set of output feature vectors that may correspond to an output data of the deterministic processing model. The method may further include determining a variation between the set of output feature vectors and the output data, and iteratively performing incremental learning of the AI model based on the determined variation.

In another embodiment, a data processing device for performing deterministic data processing through AI is disclosed. The data processing device may include a processor and a memory communicatively coupled to the processor. The memory stores processor instructions, which, on execution, may cause the processor to generate, via a deep learning network, a set of input feature vectors based on input data for a deterministic data processing model. The processor instructions, on execution, may further cause the processor to provide the set of input feature vectors to a trained AI model. The trained AI model may generate a set of output feature vectors that may correspond to an output data of the deterministic data processing model. The processor instructions, on execution, may further cause the processor to determine a variation between the set of output feature vectors and the output data, and iteratively perform incremental learning of the AI model based on the determined variation.

In yet another embodiment, a non-transitory computer-readable storage medium is disclosed. The non-transitory computer-readable storage medium has stored thereon, a set of computer-executable instructions causing a computer comprising one or more processors to perform steps including generating, via a deep learning network, a set of input feature vectors based on input data for a deterministic data processing model. The steps may further include providing the set of input feature vectors to a trained AI model. The trained AI model may generate a set of output feature vectors that may correspond to an output data of the deterministic data processing model. The steps may further include determining a variation between the set of output feature vectors and the output data, and iteratively performing incremental learning of the AI model based on the determined variation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
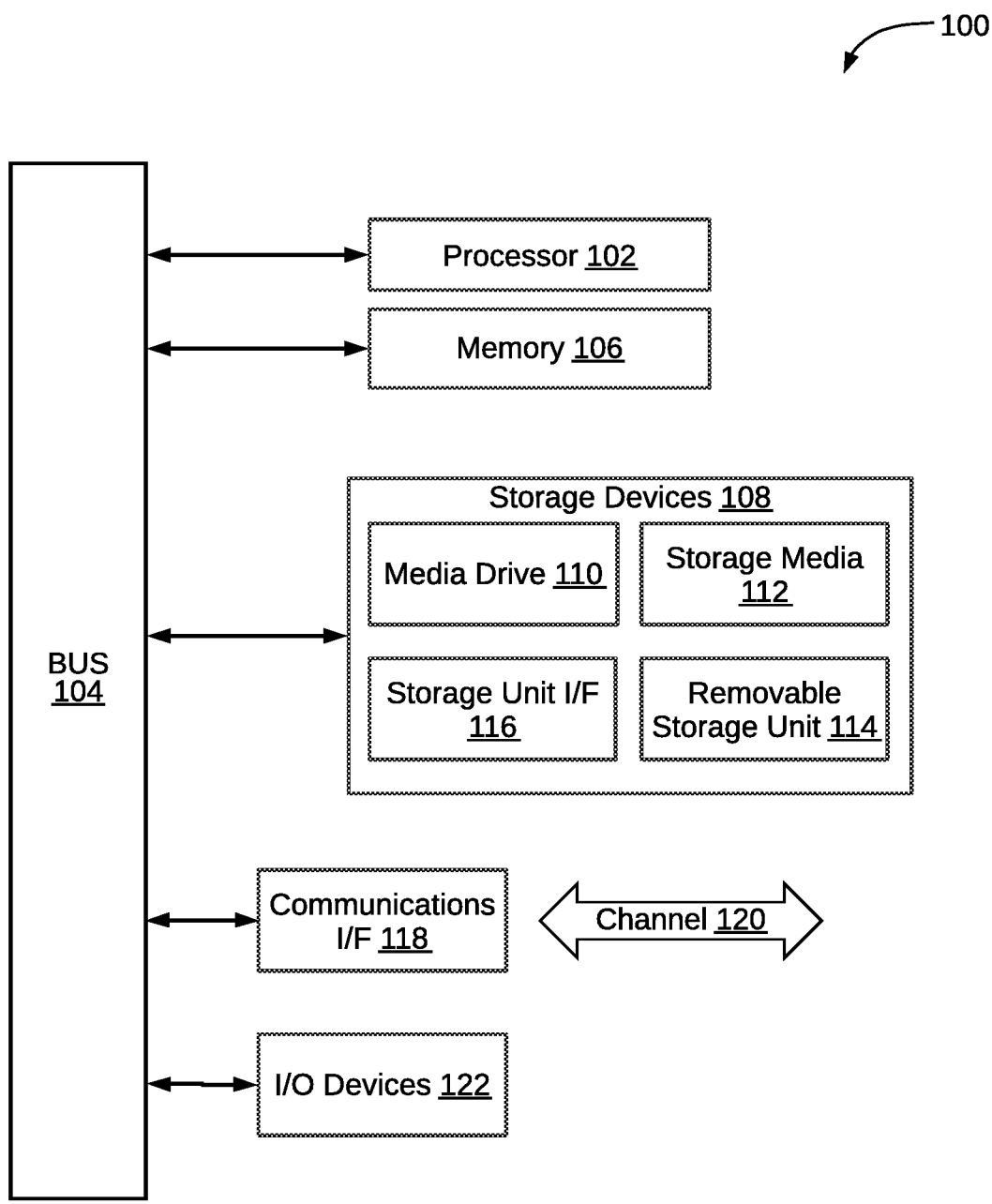
FIG. 1 is a block diagram of a computing system that may be employed to implement processing functionality for various embodiments.

Referring now to FIG. 1, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 100 may represent, for example, a user device such as a desktop, a laptop, a mobile phone, personal entertainment device, DVR, and so on, or any other type of special or general-purpose computing device as may be desirable or appropriate for a given application or environment. The computing system 100 may include one or more processors, such as a processor 102 that may be implemented using a general or special purpose processing engine such as, for example, a microprocessor, microcontroller or other control logic. In this example, the processor 102 is connected to a bus 104 or other communication medium. In some embodiments, the processor 102 may be an Artificial Intelligence (AI) processor, which may be implemented as a Tensor Processing Unit (TPU), or a graphical processor unit, or a custom programmable solution Field-Programmable Gate Array (FPGA).

The computing system 100 may also include a memory 106 (main memory), for example, Random Access Memory (RAM) or other dynamic memory, for storing information and instructions to be executed by the processor 102. The memory 106 also may be used for storing temporary variables or other intermediate information during execution of instructions to be executed by the processor 102. The computing system 100 may likewise include a read only memory ("ROM") or other static storage device coupled to bus 104 for storing static information and instructions for the processor 102.

The computing system 100 may also include a storage devices 108, which may include, for example, a media drive 110 and a removable storage interface. The media drive 110 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 112 may include, for example, a hard disk, magnetic tape, flash drive, or other fixed or removable medium that is read by and written to by the media drive 110. As these examples illustrate, the storage media 112 may include a computer-readable storage medium having stored therein particular computer software or data.

In alternative embodiments, the storage devices 108 may include other similar instrumentalities for allowing computer programs or other instructions or data to be loaded into the computing system 100. Such instrumentalities may include, for example, a removable storage unit 114 and a storage unit interface 116, such as a program cartridge and cartridge interface, a removable memory (for example, a flash memory or other removable memory module) and memory slot, and other removable storage units and interfaces that allow software and data to be transferred from the removable storage unit 114 to the computing system 100.

The computing system 100 may also include a communications interface 118. The communications interface 118 may be used to allow software and data to be transferred between the computing system 100 and external devices. Examples of the communications interface 118 may include a network interface (such as an Ethernet or other NIC card), a communications port (such as for example, a USB port, a micro USB port), Near field Communication (NFC), etc. Software and data transferred via the communications interface 118 are in the form of signals which may be electronic, electromagnetic, optical, or other signals capable of being received by the communications interface 118. These signals are provided to the communications interface 118 via a channel 120. The channel 120 may carry signals and may be implemented using a wireless medium, wire or cable, fiber optics, or other communications medium. Some examples of the channel 120 may include a phone line, a cellular phone link, an RF link, a Bluetooth link, a network interface, a local or wide area network, and other communications channels.

The computing system 100 may further include Input/Output (I/O) devices 122. Examples may include, but are not limited to a display, keypad, microphone, audio speakers, vibrating motor, LED lights, etc. The I/O devices 122 may receive input from a user and also display an output of the computation performed by the processor 102. In this document, the terms "computer program product" and "computer-readable medium" may be used generally to refer to media such as, for example, the memory 106, the storage devices 108, the removable storage unit 114, or signal(s) on the channel 120. These and other forms of computer-readable media may be involved in providing one or more sequences of one or more instructions to the processor 102 for execution. Such instructions, generally referred to as "computer program code" (which may be grouped in the form of computer programs or other groupings), when executed, enable the computing system 100 to perform features or functions of embodiments of the present invention.

In an embodiment where the elements are implemented using software, the software may be stored in a computer-readable medium and loaded into the computing system 100 using, for example, the removable storage unit 114, the media drive 110 or the communications interface 118. The control logic (in this example, software instructions or computer program code), when executed by the processor 102, causes the processor 102 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The present disclosure relates to performing deterministic data processing through Artificial Intelligence (AI). The present disclosure provides for using an existing data processing system to train an AI model to perform the same processing performed by the existing data processing system. The existing deterministic data processing system and its components may process input data to generate output data. The input and the output data may be used as training data for training the AI model. The AI model may be trained in three steps. In the first step, feature vectors may be extracted from the input data using a Conditional Generative Adversarial Network (CGAN) architecture, for example. These feature vectors may be compressed version of the input data. In the second step, feature vectors may be extracted from the output data using the CGAN architecture. These feature vectors may be compressed version of the output data. In the third step, the AI model may be trained using the CGAN architecture to apply data processing function on the feature vectors extracted in the first step and the second step. A trained AI model may replace the existing deterministic data processing system for performing its functions, if the performance of the trained AI model is better than the performance of existing deterministic data processing system. The performance metrics may include execution time, transmission time over network, storage space requirements, power consumption, and security.

Figure 2:
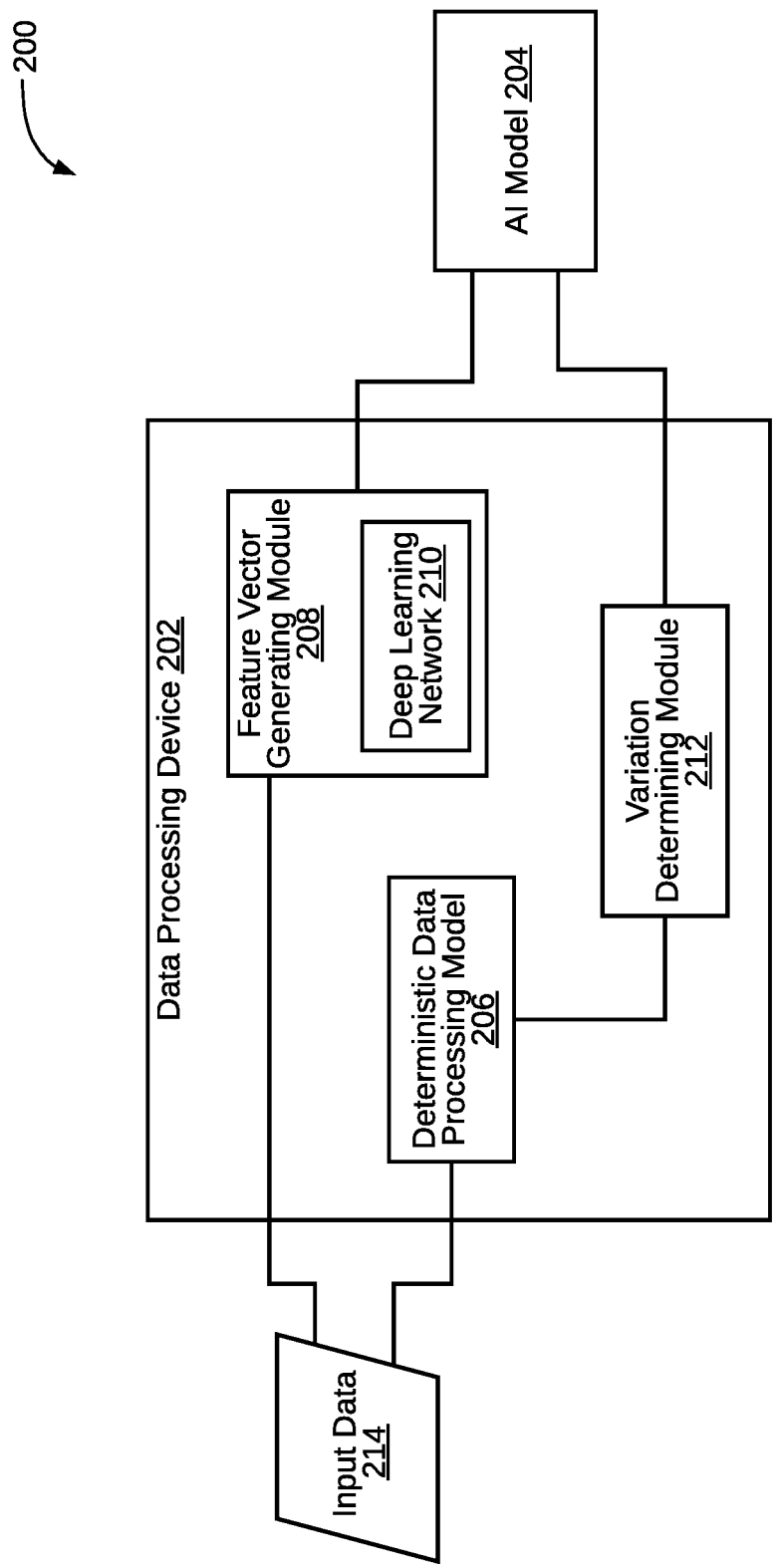
FIG. 2 is a functional block diagram of a system for performing deterministic data processing through Artificial Intelligence (AI), in accordance with an embodiment.

Referring now to FIG. 2, a functional block diagram of a system 200 for performing deterministic data processing through AI is illustrated, in accordance with an embodiment. The system 200 may include a data processing device 202 and an AI model 204. In some embodiments, the data processing device 202 may include a deterministic data processing model 206, a feature vector generating module 208, and a variation determining module 212. The feature vector generating module 208 may further include a deep learning network 210.

The deterministic data processing model 206 may receive input data 214. The deterministic data processing model 206 may further generate output data based on the input data 214. The deterministic data processing model 206 may further send the generated output data to the variation determining module 212. Further, the feature vector generating module 208 may receive the input data 214, and generate a set of input feature vectors based on the input data 214. In some embodiments, the feature vector generating module 208 may generate the set of input feature vectors via the deep learning network 210. In some embodiments, the deep learning network 210 may be a Conditional Generative Adversarial Network (CGAN).

In some embodiments, the feature vector generating module 208 may compress the set of input feature vectors in size with respect to the input data, to generate a compressed set of input feature vectors. The feature vector generating module 208 may further send the compressed set of input feature vectors to the AI model 204. The AI model 204, after being trained, may generate a set of output feature vectors based on the set of input feature vectors. It may be noted that the data processing device 202 may train the AI model 204. This is further explained in conjunction with FIG. 3. It may be noted that the set of output feature vectors may correspond to the output data of the deterministic data processing model 206.

The variation determining module 212 may receive the generated output data from the deterministic data processing model 206, and the set of output feature vectors from the AI model 204. In a manner similar to the set of input feature vectors, the set of output feature vectors may also be compressed in size with respect to the output data. The variation determining module 212 may further determine a variation between the set of output feature vectors and the output data. Based on the determined variation, the variation determining module 212 may further iteratively perform incremental learning of the AI model 204.

Figure 3:
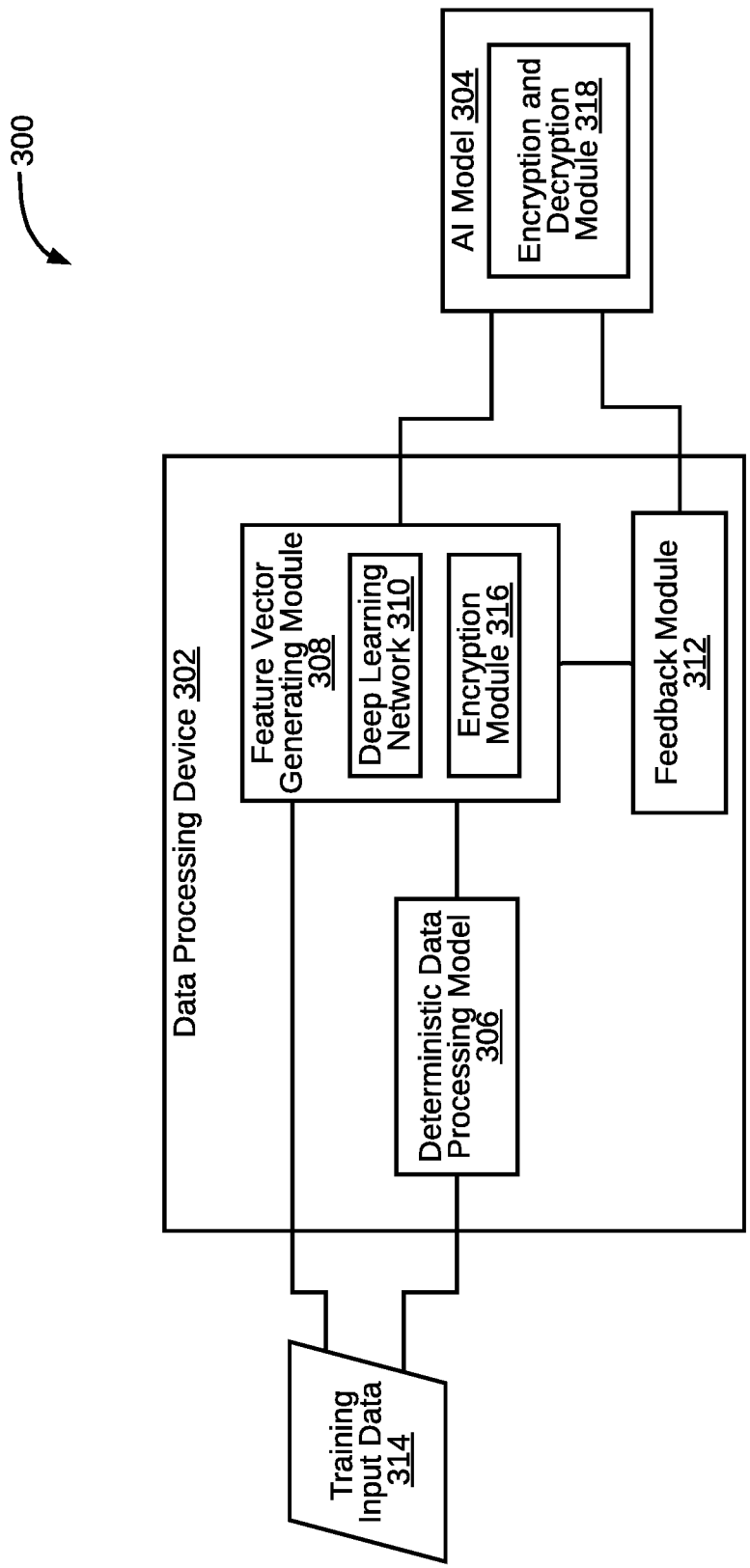
FIG. 3 is a functional block diagram of a system for training an AI model for performing deterministic data processing, in accordance with an embodiment.

Referring now to FIG. 3, a functional block diagram of a system 300 (analogous to system 200) for training an AI model 304 for performing deterministic data processing is illustrated, in accordance with an embodiment. It will be apparent to a person skilled in the art that the system 200 and the system 300 may be combined to form a single system. The system 300 may include a data processing device 302 (analogous to the data processing device 202) and the AI model 304 (analogous to the AI model 204). In order to train the AI model 304, the data processing device 302 may include a deterministic data processing model 306, a feature vector generating module 308, and a feedback module 312. The feature vector generating module 308 may further include a deep learning network 310.

The deterministic data processing model 306 may receive training input data 314. The deterministic data processing model 306 may further generate training output data based on the training input data 314. The feature vector generating module 308 may receive the training input data 314, and may generate a training set of input feature vectors based on the training input data 314. In some embodiments, the feature vector generating module 308 may generate the training set of input feature vectors via the deep learning network 310. To this end, the feature vector generating module 208 may include the deep learning network 310. The feature vector generating module 308 may further receive the training output data from the deterministic data processing model 306, and may generate a training set of output feature vectors based on the training output data associated with the deterministic data processing model 306.

The AI model 304 may receive the training set of input feature vectors and the training set of output feature vectors as input to the AI model 304 from the feature vector generating module 308. It may be noted that the AI model 304 may be trained to generate the training set of output feature vectors (output of the AI model 304) based on the training set of input feature vectors. The output of the AI model 304 may be sent to the feedback module 312 of the data processing device 302.

The feedback module 312 may receive the output of the AI model 304 and the training set of output feature vectors from the feature vector generating module 308. The feedback module 312 may compare the output of the AI model 304 with the training set of output feature vectors. Based on the comparison, the feedback module 312 may determine an output error between the output of the AI model 304 and the training set of output feature vectors.

The feedback module 312 may further receive the training set of input feature vectors from the feature vector generating module 308. The feedback module 312 may iteratively feed the output error and the training set of input feature vectors back into the AI model 304. In some embodiments, the feedback module 312 may iteratively feed the output error and the training set of input feature vectors into the AI model 304 till the output error is below a predefined threshold. In other words, every time a data processing is performed by the AI model 304, as part of the training of the AI model 304, the output error and the training set of input feature vectors may be fed into the AI model 304. This may be repeated until a sufficient accuracy of data processing is achieved by the AI model 304.

As a result, as the AI model 304 is trained over time, the AI model 304 may become more and more efficient in performing the functions of the deterministic data processing model 306. In other words, as the AI model 304 is trained over time, time taken by the AI model 304 to perform deterministic data processing each time may go on reducing. This is further explained in detail in conjunction with FIG. 4.

Figure 4:
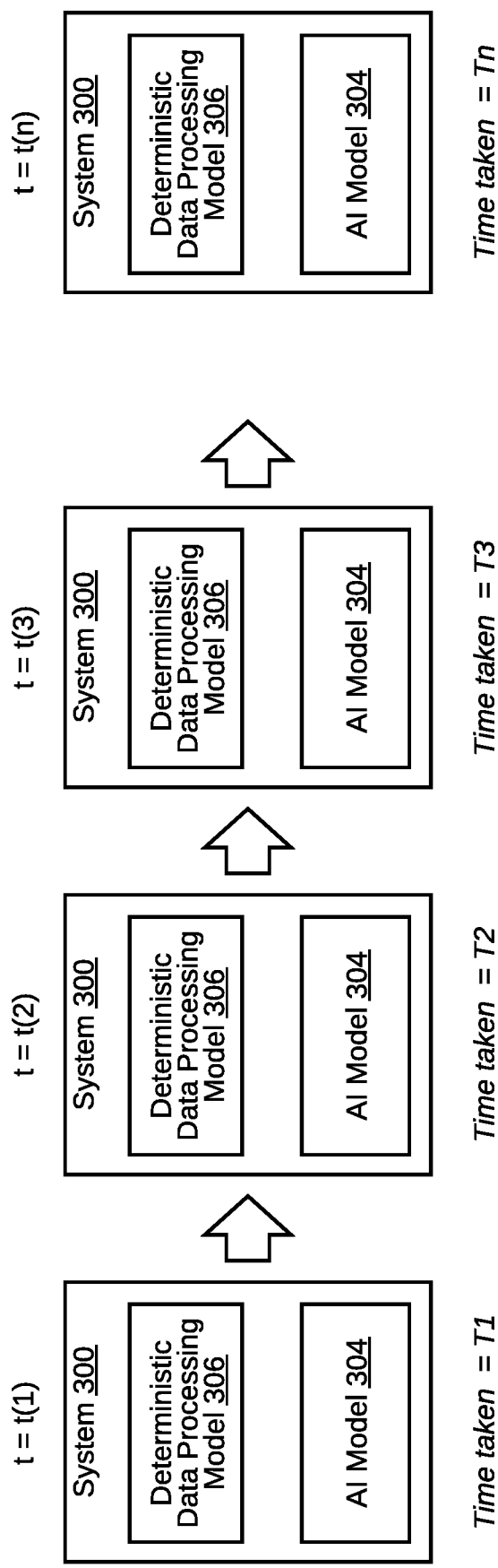
FIG. 4 is a block diagram of a process of training an AI model, in accordance with an embodiment.

Referring now to FIG. 4, a process of training the AI model 304 is illustrated, in accordance with an exemplary embodiment. At time instance t=t(1), the trained AI model 304 may be put to operation for performing the functions of the deterministic data processing model 306. As such, at time instance t=t(1), the time taken by the AI model 304 for performing the functions of the deterministic data processing model 306 may be T1. Further, by a time instance t=t(2), the AI model 304 may have been further trained, as a result of which, time (T2) taken by the AI model 304 for performing the functions of the deterministic data processing model 306 may reduce as compared to T1, i.e. T2<T1. Further, at a time instance t=t(3), the time taken by the AI model 304 for performing the functions of the deterministic data processing model 306 may be T3. As by the time instance t=t(3), the AI model 304 may be have trained some more, the time (T3) taken by the AI model 304 for performing the functions of the deterministic data processing model 306 may further reduce as compared to T1 and T2, i.e. T3<T2<T1. Similarly, at time instance t=t(n), the time taken by the AI model 304 for performing the functions of the deterministic data processing model 306 may be Tn, such that Tn<T3<T2<T1. The time Tn may be comparatively much lower than the time take by the deterministic data processing model 306 to perform the same data processing functionality.

Referring back to FIG. 3, in some embodiments, the feature vector generating module 308 may further include an encryption module 316. The encryption module 316 may encrypt the training set of input feature vectors and the training set of output feature vectors based on Homomorphic keys. It may be noted that in such embodiments, the AI model 304 may be trained using encrypted training set of input vectors and encrypted training set of output vectors.

In some embodiments, once the AI model 304 is trained, the trained AI model 304 may then process encrypted set of input feature vectors to generate encrypted set of output feature vectors. In alternate embodiments, the trained AI model 304 may include an encryption and decryption module 318. The encryption and decryption module 318 may first decrypt the set of input feature vectors to generate set of output feature vectors. Further, the encryption and decryption module 318 may encrypt the set of output feature vectors. The encryption and decryption module 318 may send the encrypted set of output feature vectors to the feedback module 312.

The feedback module 312 may receive the encrypted training set of output feature vectors from the feature vector generating module 308. The feedback module 312 may further receive the encrypted set of output feature vectors from the AI model 304. The feedback module 312 may determine an output error between encrypted training set of output feature vectors (from the feature vector generating module 308) and the encrypted set of output feature vectors (from the AI model 304). The feedback module 312 may further iteratively feed the output error and the training set of input feature vectors into the AI model till the output error is below a predefined threshold.

Figure 5A:
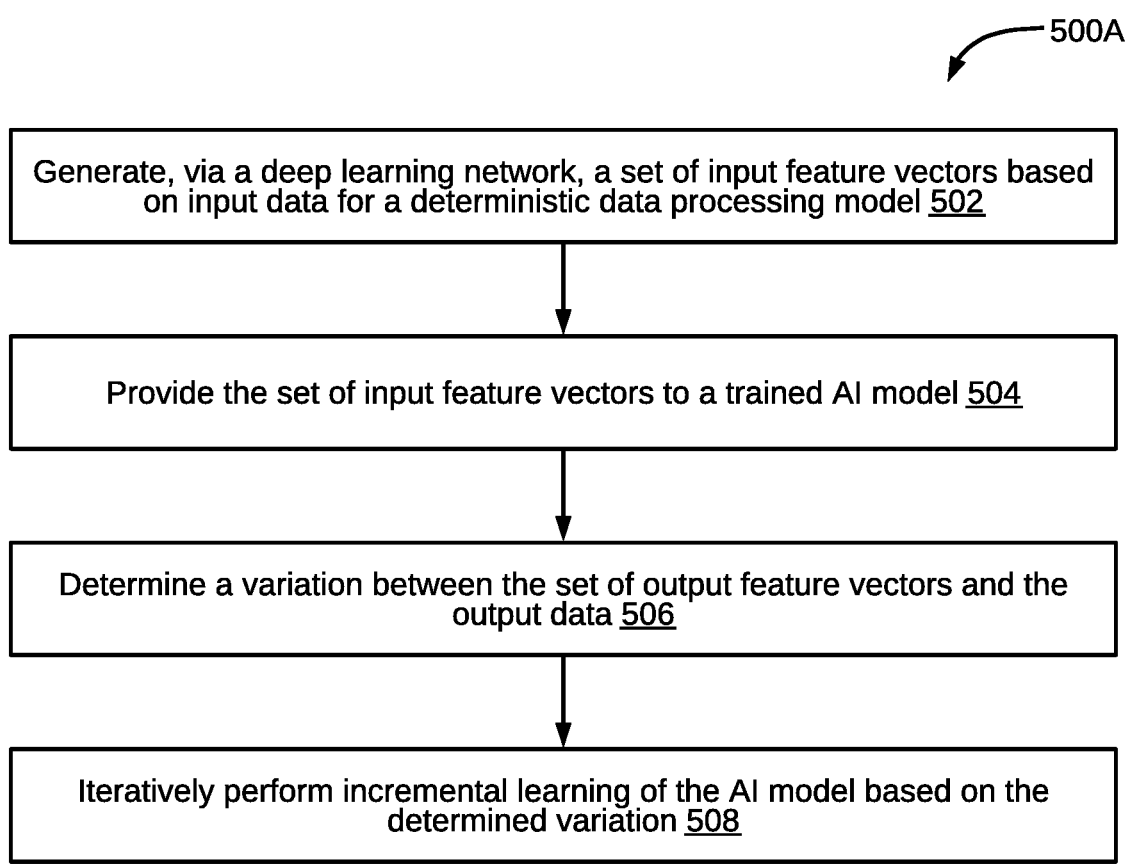
FIGS. 5A-5B are flowcharts of a method for performing deterministic data processing through Artificial Intelligence (AI) and training an AI model to perform deterministic data processing, in accordance with an embodiment.

Referring now to FIG. 5A, a flowchart of a method 500A for performing deterministic data processing through AI is illustrated, in accordance with an embodiment. In some embodiments, the method 500A may be performed using the data processing device 202. At step 502, a set of input feature vectors may be generated, via a deep learning network, based on input data for a deterministic data processing model (for example, the deterministic data processing model 206). In some embodiments, the deep learning network may be a CGAN. In some embodiments, the set of input feature vectors may be compressed in size with respect to the input data. Further, the set of output feature vectors may be compressed in size with respect to the output data.

At step 504, the set of input feature vectors may be provided to a trained AI model. The trained AI model may generate a set of output feature vectors that corresponds to an output data of the deterministic data processing model. At step 506, a variation may be determined between the set of output feature vectors and the output data. At step 508, an incremental learning of the trained AI model may be performed iteratively, based on the determined variation. In some embodiments, the method 500A may further include training the AI model. This is further explained in detail, in conjunction with FIG. 5B.

Figure 5B:
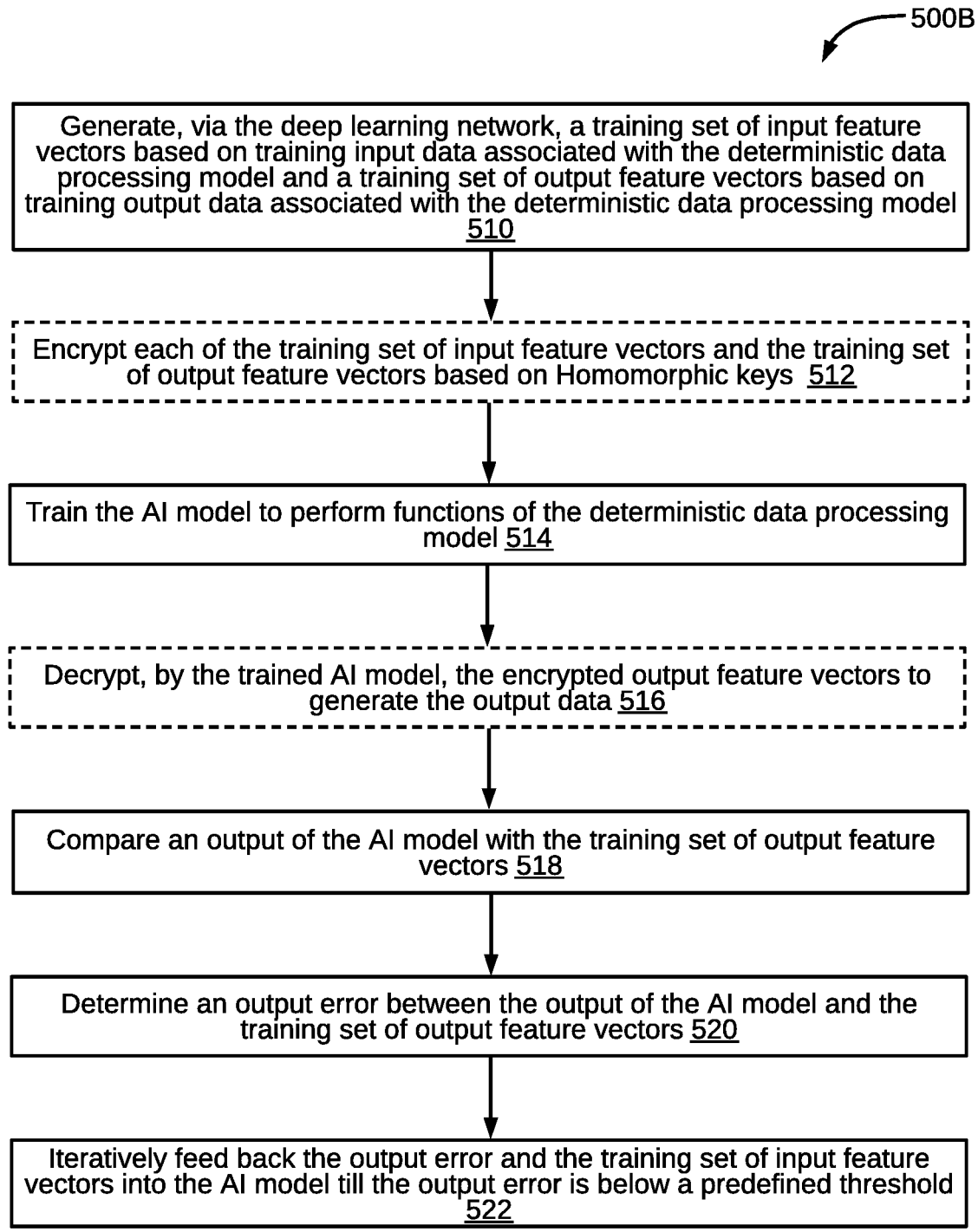

Referring now to FIG. 5B, a flowchart of a method 500B for training an AI model to perform deterministic data processing is illustrated, in accordance with an embodiment. At step 510, a training set of input feature vectors may be generated, via the deep learning network, based on training input data associated with the deterministic data processing model. Further, at step 510, a training set of output feature vectors may be generated, via the deep learning network, based on training output data associated with the deterministic data processing model.

In some embodiments, additionally, at step 512, each of the training set of input feature vectors and the training set of output feature vectors may be encrypted based on Homomorphic keys. It may be noted that in such embodiments, the AI model may be trained using encrypted training set of input vectors and encrypted training set of output vectors. Further, the trained AI model may process the encrypted set of input feature vectors to generate encrypted set of output feature vectors.

At step 514, the AI model may be trained to perform functions of the deterministic data processing model 206. In order to train the AI model, the training set of input feature vectors and the training set of output feature vectors may be provided as input to the AI model. It may be noted that the AI model may be trained to generate the training set of output feature vectors based on the training set of input feature vectors as input. It may be noted that if the AI model is being trained using encrypted training set of input vectors and encrypted training set of output vectors, then the method may proceed to an additional step 516, where the encrypted output feature vectors may be decrypted, by the trained AI model, to generate the output data.

At step 518, an output of the AI model may be compared with the training set of output feature vectors. At step 520, an output error may be determined between the output of the AI model and the training set of output feature vectors. At step 522, the output error and the training set of input feature vectors may be iteratively fed back into the AI model till the output error is below a predefined threshold.

As will be also appreciated, the above described techniques may take the form of computer or controller implemented processes and apparatuses for practicing those processes. The disclosure may also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6A:
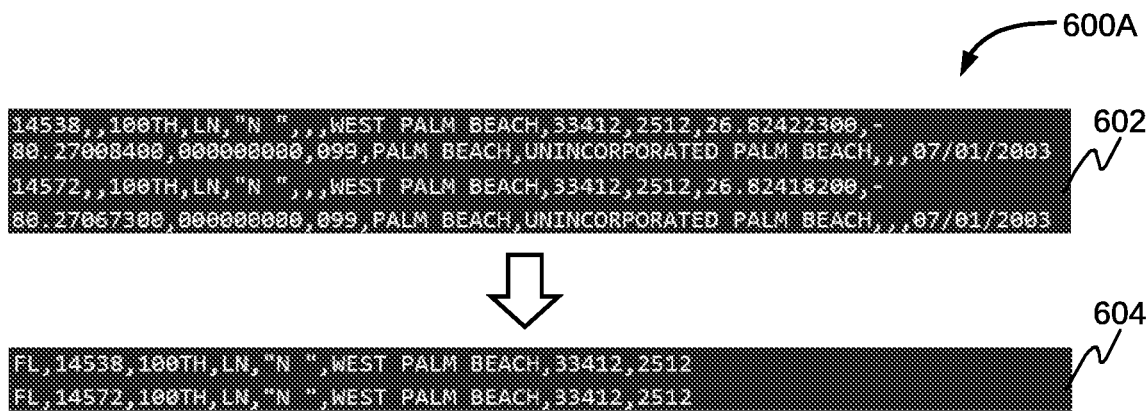
FIG. 6A illustrates an overview of a process of performing address normalization, in accordance with an exemplary embodiment.

In an exemplary scenario, the above techniques may be used for performing address normalization, where one address format may be required to be translated into another normalized format. For example, FIG. 6A shows an overview of a process 600A of performing address normalization, in accordance with an exemplary embodiment. As shown in FIG. 6A, an input data 602 corresponding to "Palm Beach Addresses" may be deterministically processed to generate an output normalized data 604. It may be noted that in order to perform the deterministic data processing, a data mapping may be performed, as shown in FIG. 6B.

Figure 6B:
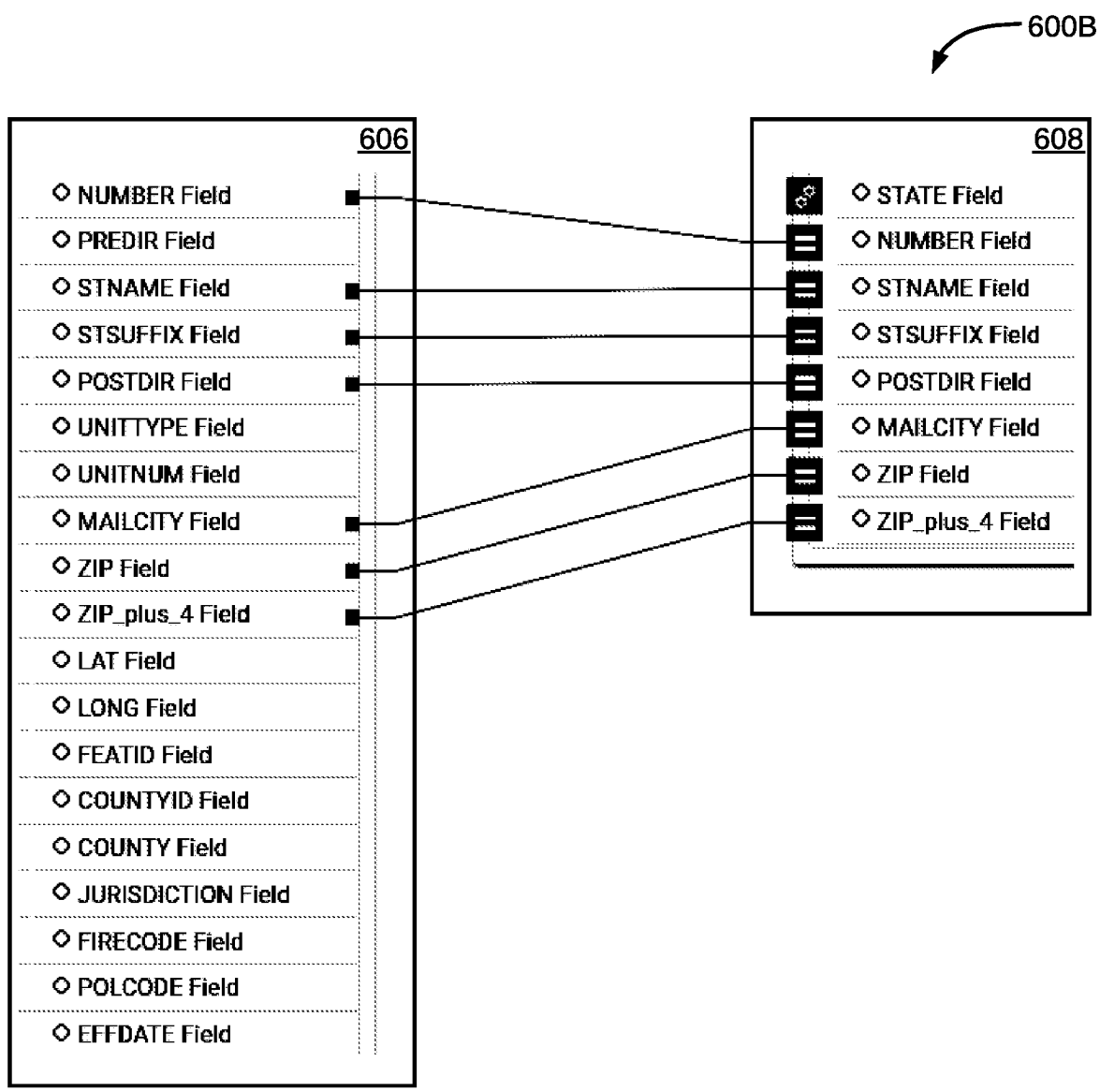
FIG. 6B illustrates a process of text representation of mapping between input fields and output fields, in accordance with an exemplary embodiment.

Referring now to FIG. 6B, a process 600B of text representation of mapping between input fields and output fields is illustrated, in accordance with an exemplary embodiment. As shown in the FIG. 6B, the mapping may be performed between the input fields presented in a first column 606 and the output fields presented in a second column 608. It may be noted that some of the input fields from the first column 606 may be mapped to the output fields in the second column 608. It may be further noted that the data mapping may be used to provide training data for an AI model. For example, the AI model may be a Recurrent Neural network (RNN). It may be understood that the training may last until the RNN is able to replicate the deterministic data mapping with zero errors. The input data (i.e., input address) may be in form of input sequence of characters. The output data (i.e., normalized address) may be in the form of output sequence of characters. It may be noted that records, like historical records, may be provided in parallel to speed up the processing.

In another exemplary scenario, the above techniques may be used to perform integer addition over data by using feature extraction, and to further perform homomorphic addition using AI. For example, input data may include image representations of single digit numbers (0, 1, 2, 3, 4, 5, 6, 7, 8, 9, 10). In other examples, any other type of digit representations may be used, for example digit representations including combination of digits with random data (noise). Using an Artificial Neural Network (ANN), each digit image may be transformed into its feature representation. Once the features are extracted, one or more additional ANN layers may be applied to learn the proper transformation over the extracted feature that would emulate the addition process (i.e., homomorphic addition), via a two-step process, as described below.

Figure 7A:
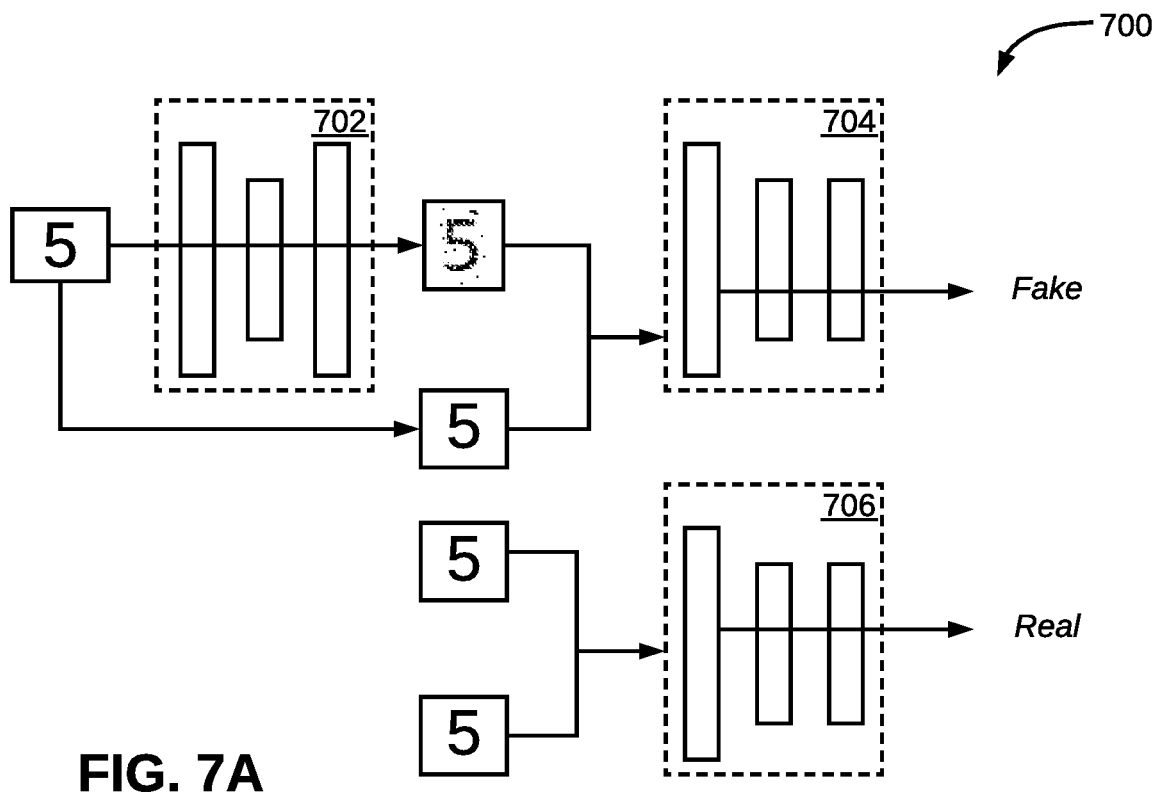
FIGS. 7A-7B illustrate an exemplary autoencoder for performing integer addition over data, in accordance with an exemplary embodiment.

At a first step, an autoencoder 700 (exemplary) built from Convolutional Neural Network (CNN) discriminators 704, 706 using a CGAN generator 702 may be trained to extract the feature representations of the digit images. FIG. 7A shows the autoencoder 700 for performing integer addition over data. An adversarial training of the autoencoder 700 may be performed. As will be appreciated by those skilled in the art, a denoising autoencoder may include two CNNs (discriminators) with back to back pooling. It will be further appreciated that such an architecture may also be multi layered with multiple CNN and pooling layers. Further, a dense ANN part in the middle may also be multi-layered. A left half of the CGAN generator 702 may perform convolution and a right half of the CGAN generator 702 may perform image reconstruction from the feature vector. The feature vector may be an output from a dense layer in the middle.

As will be further appreciated, the training of the CGAN generator 702 may be performed in two parts. The CGAN generator 702 may keep trying to trick the CNN discriminators 704, 706 to recognize fake images as real. The CNN discriminators 704, 706 may keep trying to recognize images created by the CGAN generator 702 created as fake. The training may continue until there is no progress in learning, i.e., the CGAN generator 702 generates the image replicas that are indistinguishable from the real image of the number. At this point, all weights of the autoencoder 700 are trained well enough to enable correct feature extraction. Applying this training algorithm to the whole data space, the autoencoder 700 may be fully trained. For example, if the addends data space is in integer set (0, 1, 2, 3, 4, 5, 6, 7, 8, 9, 10), then the result of binary addition operation will be set of (0, 1, 2, 3, 4, 5 . . . 20).

Figure 7B:
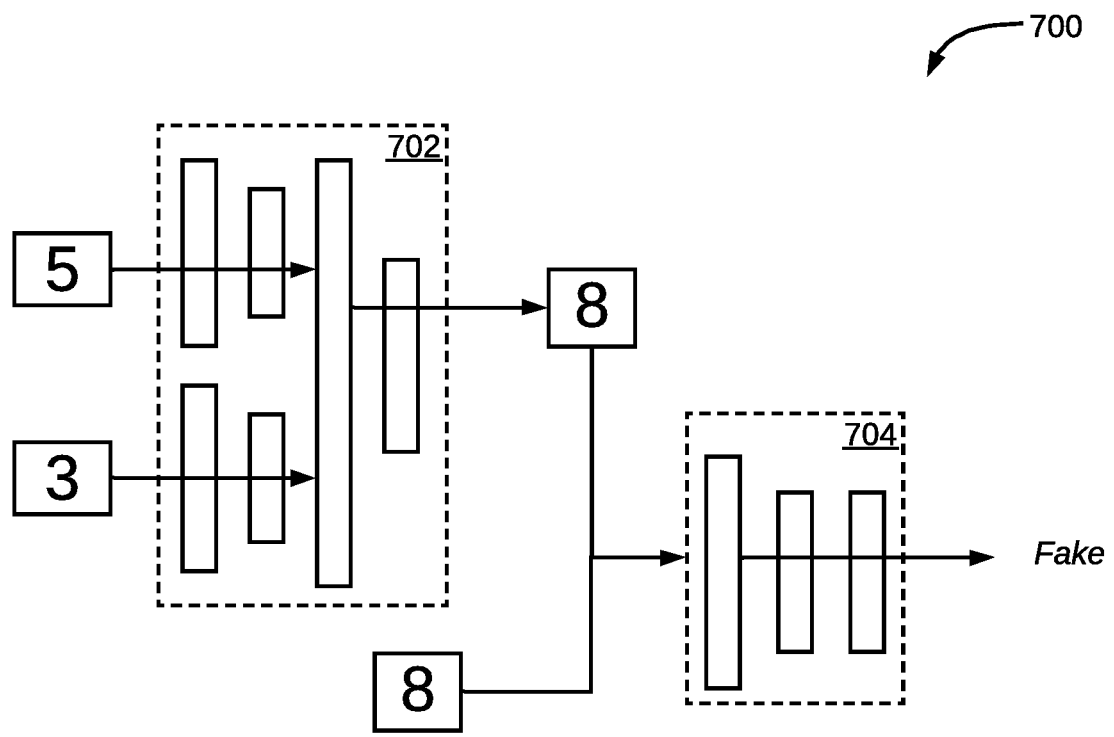

At a second step, an additional operation of implementing the homomorphic addition over the extracted feature may be learned. Once the data space is explored and the learning process is complete, the additional operation (i.e., homomorphic addition) may be learned by freezing the ANN learning for the CNN discriminators 704, 706 and the CGAN generator 702, as shown in FIG. 7B.

For example, the addition operation may be learned by adding deep dense layers that concatenates features from the numbers "5" and "3", and provides output to the pretrained CNN decoder from step 1. As mentioned above, the dense layers in the middle may be multi-layered. The only part of the network that may need the training is the newly added dense part that performs the homomorphic add operation. It may be noted that the discriminator may also need to be trained so that the decoder of the CGAN generator is not able to trick the discriminator. The training may be complete when the discriminator is not able to recognize the generated output from the CNN decoder being fake.

For simplicity, a bitmap picture presentation of the numbers may be used to extract the features. However, other deterministic presentation of numbers may be used that are harder to guess what the data represents, including encrypting the data. In these cases, the CNN could be replaced with dense layers, or combination of dense and CNN layers. Further, the features of encrypted data presentation may be sent over a communication network, and homomorphic transformations may be applied as part of the service in the cloud.

As will be appreciated by those skilled in the art, the above techniques relate to performing deterministic data processing through Artificial Intelligence (AI). The techniques provide for homomorphic encrypting of feature vector data extracted from input and output data, which makes the feature vector data safer to be transmitted and stored in memory or disk. This further provides capability of processing the data in motion without the need of data to be decompressed or decrypted. Therefore, the data processing may be done in a safer manner on remote nodes in a cloud, as compared to conventional deterministic data processing, in which the data in motion is not protected. Further, the data processing functions are applied over feature vectors which are compressed presentation of the input data. Due to this, requirement of computational power and storage space is less. Moreover, the speed of data processing speed is better than the speed of the conventional deterministic data processing system.

The specification has described method and system for performing deterministic data processing through AI. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing deterministic data processing through Artificial intelligence (AI), the method comprising: generating, via a deep learning network, a set of input feature vectors based on input data for a deterministic data processing model;
    training an AI model to perform functions of the deterministic data processing model, wherein training the AI model comprises: providing a training set of input feature vectors and a training set of output feature vectors as input to the AI model, wherein the AI model is trained to generate the training set of output feature vectors based on the training set of input feature vectors as input, wherein each of the training set of input feature vectors and the training set of output feature vectors is encrypted, based on Homomorphic keys, and wherein the AI model is trained using the encrypted training set of input vectors and encrypted training set of output vectors; providing the set of input feature vectors to a the trained AI model, wherein the trained AI model generates a set of output feature vectors that corresponds to output data of the deterministic data processing model; determining a variation between the set of output feature vectors generated by the trained AI model and the output data of the deterministic data processing model; and iteratively performing incremental learning of the AI model based on the determined variation.

2. The method of claim 1, wherein the deep learning network is Conditional Generative Adversarial Network (CGAN), and the set of input feature vectors is compressed in size with respect to the input data and the set of output feature vectors is compressed in size with respect to the output data.

3. The method of claim 1 further comprising generating, via the deep learning network, a training set of input feature vectors based on training input data associated with the deterministic data processing model and a training set of output feature vectors based on training output data associated with the deterministic data processing model.

4. The method of claim 3, further comprising: comparing an output of the AI model with the training set of output feature vectors; determining an output error between the output of the AI model and the training set of output feature vectors;
    and iteratively feeding back the output error and the training set of input feature vectors into the AI model till the output error is below a predefined threshold.

5. The method of claim 4, wherein the trained AI model processes encrypted set of input feature vectors to generate encrypted set of output feature vectors.

6. The method of claim 5, further comprising decrypting, by the trained AI model, the encrypted output feature vectors to generate the output data.

7. A data processing device for performing deterministic data processing through Artificial Intelligence (AI), the data processing device comprising: a processor; and a memory communicatively coupled to the processor, wherein the memory stores processor instructions, which, on execution, causes the processor to: generate, via a deep learning network, a set of input feature vectors based on input data for a deterministic data processing model; training an AI model to perform functions of the deterministic data processing model, wherein training the AI model comprises: providing a training set of input feature vectors and a training set of output feature vectors as input to the AI model, wherein the AI model is trained to generate the training set of output feature vectors based on the training set of input feature vectors as input, wherein each of the training set of input feature vectors and the training set of output feature vectors is encrypted, based on Homomorphic keys, and wherein the AI model is trained using the encrypted training set of input vectors and encrypted training set of output vectors; provide the set of input feature vectors to a the trained AI model, wherein the trained AI model generates a set of output feature vectors that corresponds to output data of the deterministic data processing model; determine a variation between the set of output feature vectors generated by the trained AI model and the output data of the deterministic data processing model; and iteratively perform incremental learning of the AI model based on the determined variation.

8. The data processing device of claim 7, wherein the deep learning network is Conditional Generative Adversarial Network (CGAN), and the set of input feature vectors is compressed in size with respect to the input data and the set of output feature vectors is compressed in size with respect to the output data.

9. The data processing device of claim 7, wherein the processor instructions further cause the processor to: generate, via the deep learning network, a training set of input feature vectors based on training input data associated with the deterministic data processing model and a training set of output feature vectors based on training output data associated with the deterministic data processing model.

10. The data processing device of claim 9, wherein the processor instructions further cause the processor to compare an output of the AI model with the training set of output feature vectors; determine an output error between the output of the AI model and the training set of output feature vectors; and iteratively feedback the output error and the training set of input feature vectors into the AI model till the output error is below a predefined threshold.

11. The data processing device of claim 9, wherein the trained AI model processes encrypted set of input feature vectors to generate encrypted set of output feature vectors, and wherein the trained AI model decrypts the encrypted output feature vectors to generate the output data.

12. A non-transitory computer-readable storage medium having stored thereon, a set of computer-executable instructions causing a computer comprising one or more processors to perform steps comprising: generating, via a deep learning network, a set of input feature vectors based on input data for a deterministic data processing model; training an AI model to perform functions of the deterministic data processing model, wherein training the AI model comprises: providing a training set of input feature vectors and a training set of output feature vectors as input to the AI model, wherein the AI model is trained to generate the training set of output feature vectors based on the training set of input feature vectors as input, wherein each of the training set of input feature vectors and the training set of output feature vectors is encrypted, based on Homomorphic keys, and wherein the AI model is trained using the encrypted training set of input vectors and encrypted training set of output vectors providing the set of input feature vectors to a the trained AI model, wherein the trained AI model generates a set of output feature vectors that corresponds to output data of the deterministic data processing model; determining a variation between the set of output feature vectors generated by the trained AI model and the output data of the deterministic data processing model; and; iteratively performing incremental learning of the AI model based on the determined variation.

13. The non-transitory computer-readable storage medium of claim 12, wherein the steps further comprise generating, via the deep learning network, a training set of input feature vectors based on training input data associated with the deterministic data processing model and a training set of output feature vectors based on training output data associated with the deterministic data processing model.

14. The non-transitory computer-readable storage medium of claim 13, wherein the steps further comprise: comparing an output of the AI model with the training set of output feature vectors; determining an output error between the output of the AI model and the training set of output feature vectors; and iteratively feeding back the output error and the training set of input feature vectors into the AI model till the output error is below a predefined threshold.

15. The non-transitory computer-readable storage medium of claim 14, wherein the trained AI model processes encrypted set of input feature vectors to generate encrypted set of output feature vectors, and wherein the steps further comprise decrypting, by the trained AI model, the encrypted output feature vectors to generate the output data.

\* \* \* \* \*